United States Patent [19]
Brown

[11] 3,966,301

[45] June 29, 1976

[54] TRANSPARENT SCREEN HAVING INTERMITTENT PORTIONS FOR REDUCING REFLECTION FROM AMBIENT LIGHT

[75] Inventor: John W. Brown, Flemington, N.J.

[73] Assignee: Qantix Corporation, Flemington, N.J.

[22] Filed: Oct. 16, 1975

[21] Appl. No.: 622,896

Related U.S. Application Data

[63] Continuation-in-part of Ser. No. 534,297, Dec. 19, 1974, abandoned.

[52] U.S. Cl. .............................. 350/128; 350/129
[51] Int. Cl.² ....................................... G03B 21/60
[58] Field of Search ........... 350/127, 128, 129, 126, 350/106, 167, 109

[56] References Cited
UNITED STATES PATENTS

| | | | |
|---|---|---|---|
| 2,351,034 | 6/1944 | Gabor | 350/128 X |
| 2,991,693 | 7/1961 | MacNeille | 350/128 |
| 3,782,805 | 1/1974 | Brown | 350/129 |

Primary Examiner—L. T. Hix
Assistant Examiner—E. M. O'Connor
Attorney, Agent, or Firm—Lerner, David, Littenberg & Samuel

[57] ABSTRACT

A front projection screen manufactured from transparent material is disclosed. The back side of the screen includes a plurality of prism-like elements so that light incident upon the screen from a preferred direction is totally reflected by the screen, while light incident upon the screen from other directions will pass therethrough. The parallel ridges are intermittently interrupted by repeating surfaces formed parallel to the plane of the front surface of the screen. The sides of the prism-like elements on the back surface of the screen are curved to provide dispersion in a horizontal plane, while the front surface of the screen has segments of cylindrical columns formed thereon perpendicular to the prism-like elements to form an angular light spread in a vertical plane. The repeating surfaces formed on the back surface of the screen, and interrupting the plurality of parallel ridges thereon, permits ambient light directed from non-preferred directions to either be passed through the screen without reflection, or to be absorbed thereby, so that this light is not reflected back thereby. These repeating surfaces preferably, in the former case, comprise repeating planar surfaces, and in the latter case preferably comprise light absorbing coatings. In a preferred embodiment, were particularly repeating planar surfaces are employed, the length of each intermittent parallel ridge divided by the width of the adjacent planar surface is greater than the distance from the focal point of each cylindrical section on the front surface of the screen to the parallel ridge on the back surface divided by the thickness of the screen.

17 Claims, 9 Drawing Figures

TRANSPARENT SCREEN HAVING INTERMITTENT PORTIONS FOR REDUCING REFLECTION FROM AMBIENT LIGHT

CROSS-REFERENCES TO RELATED APPLICATIONS

This application is a Continuation-in-Part of application Ser. No. 534,297, filed on Dec. 19, 1974, now abandoned.

FIELD OF THE INVENTION

The present invention relates to projection screens, and particularly front projection screens. More particularly, the present invention relates to projection screens which do not reflect ambient light directed on the screen from other than a preferred direction.

BACKGROUND OF THE INVENTION

Projection screens for the display of pictures are well known in the art. Most of the screens have traditionally had a material on the surface thereof for the dispersion of light incident thereon, such as from a projector, in a multitude of directions.

As described in my prior U.S. Pat. No. 3,782,805, previous attempts have been made to direct light upon the screen from the projector into a predetermined viewing area. Thus, in my prior patent, No. 3,712,708, a lenticular projection screen is disclosed consisting of a plurality of overlapping spherical concave lenses formed in reflective material. Therein, the lenses in the screen are constructed so that the projected light rays are reflected to predetermined viewing areas in front of the screen.

When such screens are made of a reflective material, problems of reflections from sources other than the projector obviously arise. While these can be overcome by operating in a dark room, even in such a case extraneous light sources are always a problem. In addition, while attempts have been made to put light absorbing elements in predetermined locations with respect to the reflective material in the screen, such attempts have added additional annoyance to the use of the screen and/or additional costs thereto.

As discussed in my U.S. Pat. No. 3,782,805, U.S. Pat. No. 1,610,423 to Cawley shows a daylight projection screen in which the transparent material is shaped to have prism-like ridges on the back thereof for reflecting light incident thereon from a predetermined angle. Cawley, however, teaches that the critical angle of the material used should be as close to 45° as possible, that the angle of the sides of the prism-like portions should be inclined with respect to the plane of the material at 45°. In this manner, the Cawley projection screen reflects only light incident upon the screen from a single direction back towards the audience with all other light passing therethrough. Thus, if the audience is not located directly in front of the screen, or if the screen is moved by a slight angle with respect to the incoming projected light, the image reflected back to the audience is lost. Similarly, this results if the audience is not sitting in its precise angular relationship respecting the screen.

In my U.S. Pat. No. 3,782,805, I therefore taught a projection screen which efficiently uses the light provided by the projector, but does not reflect undesirable images to the audience and is viewable from positions other than directly in front of the screen. The projection screen thus taught in my patent has proved to be extremely significant, and has demonstrated remarkable results with respect to the ability to reflect back to the audience only light incident upon the screen from a small predetermined angle, while permitting light from outside that angle to pass therethrough.

SUMMARY OF THE INVENTION

It has now been discovered that by slightly modifying the projection screen taught in my U.S. Pat. No. 3,782,805, issued on Jan. 1, 1974, it is possible to more perfectly descriminate between the light projected on the screen from a predetermined angle and other ambient light incident upon the screen from angles outside of that predetermined angle. Furthermore, it has also been discovered that this can be accomplished without seriously effecting the "tiltability" of the screen, that is the necessity to precisely place the screen in the vertical plane with respect to the projector in order to still reflect the incident light thereon back to the audience. This has been accomplished by providing a front projection screen made from a sheet of light transmitting material having a predetermined critical angle of internal reflection of less than 45°. The sheet has a front surface and a back surface, the front surface having a plurality of parallel ridges formed thereon, each forming a section of a cylinder having a predetermined focal length, and the back surface having a plurality of parallel ridges formed thereon, each of these ridges having curved sides terminating at a peak, the curved sides extending away from the sheet at an angle equal to or greater than 45°. The angle of the side with respect to the sheet continuously decreases as the curved sides extend towards the peak, so that the angle of the sides is greater than or equal to the predetermined critical angle of internal reflection at the peak, but less than 45°. Furthermore, the ridges on the front surface are disposed perpendicularly to the ridges on the back surface, and the parallel ridges formed on the back surface are intermittently interrupted by a plurality of repeating surfaces formed parallel to the plane of the ridges on the front surface, so that light incident upon these surfaces is not reflected therefrom. The intermittent surfaces on the back surface of the screen are thus placed in locations corresponding to the points of intersection of the parallel ridges forming cylindrical sections on the front surface of the screen.

In one embodiment of this invention, these intermittent surfaces comprise coatings of light-absorbing materials, so that light incident therein is absorbed thereby, while in another embodiment, these intermittent surfaces comprise planar surfaces intermittently interrupting the parallel ridges formed on the back surface of the screen.

In a preferred embodiment, the ratio of the length of each portion of the intermittently interrupted parallel ridges on the back surfaces of the screen to the width of the adjacent repeating surface is greater than the ratio of the distance from the focal point of each cylindrical section on the front surface of the screen to the parallel ridges on the back surface of the screen to the thickness of the screen.

DESCRIPTION OF THE DRAWINGS

For a more complete understanding of the invention, reference should be made to the following detailed description and drawings in which.

DETAILED DESCRIPTION OF THE INVENTION

Figure 1:
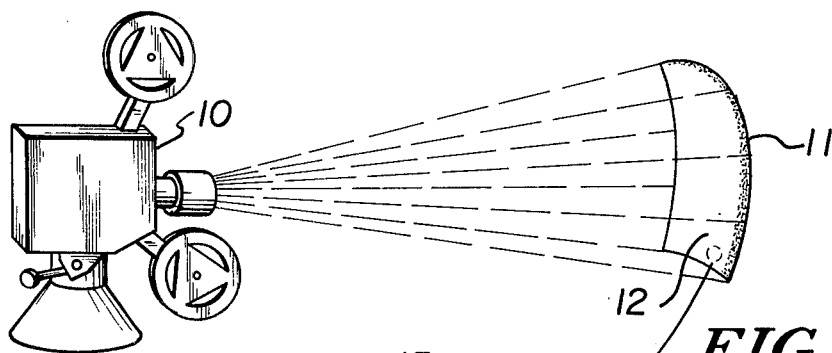
FIG. 1 is a schematic perspective view of a front projection system employing a screen constructed in accordance with the teachings of this invention.

Referring now to FIG. 1 we see a front projection system employing a screen constructed in accordance with the teachings of this invention. A projector 10 is mounted a fixed distance from a screen 11 which is formed as a section of a sphere having a radius of curvature equal to the distance between the screen 11 and the projector 10. It is of course understood that as the distance between the projector 10 and the screen 11 becomes greater, the need for the precise curvature of the screen 11 becomes less important so that as the distance becomes substantial the screen 11 may in fact be flat. The reason for the curvature of the screen 11 is to insure that the rays of light emanating from the projector 10 incident upon the screen 11 strikes a front surface of the screen 12 normal thereto at each point thereof.

Figure 2:
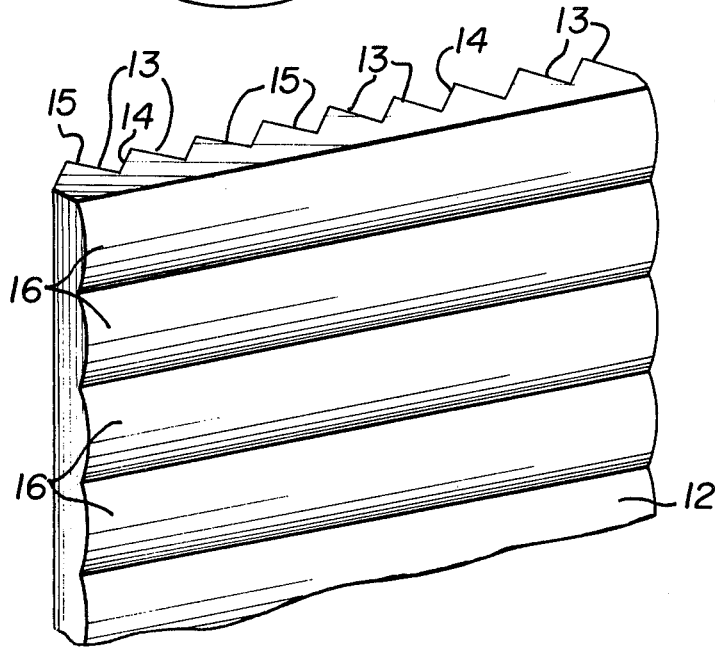
FIG. 2 is a front perspective view of the screen shown in FIG. 1.
Figure 3:
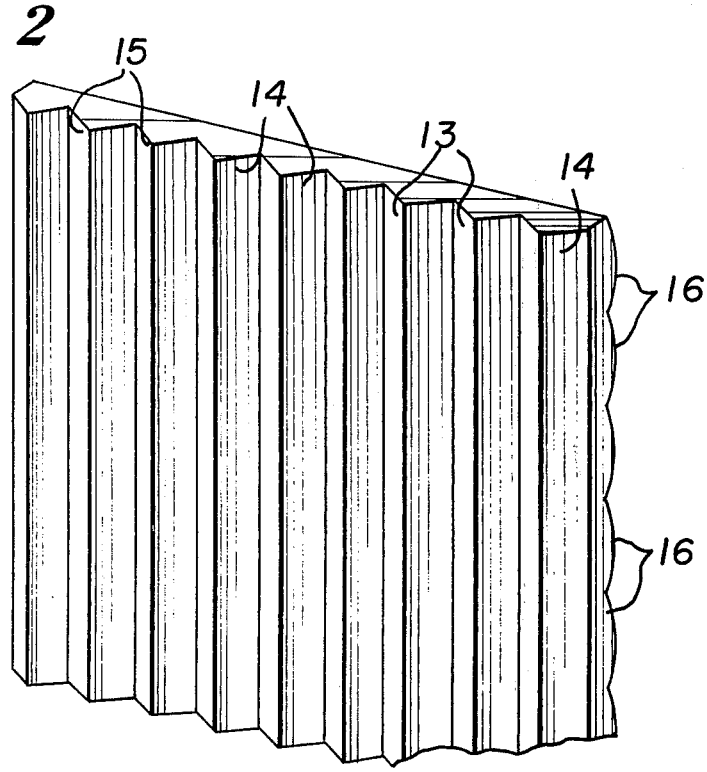
FIG. 3 is a back perspective view of the improved projection screen of my U.S. Pat. No. 3,782,805.

Referring now to FIGS. 2 and 3, we see the details of a small section of the screen 11 in the form desired in U.S. Pat. No. 3,782,805. It should be understood that the screen is uniform throughout so that the section shown in FIG. 2 is representative of the makeup of screen 11.

The screen 11 is made from a transparent material which has a critical angle of internal reflection less than 45°. A critical angle of internal reflection is defined as the angle at which light must strike a surface of material when passing from the inside to the outside thereof to a second predetermined medium so as to be totally reflected rather than passing to the second medium. The angle of incidence as referred to above is measured between the ray of light and a line normal to the surface of interest at the point of incidence. The critical angle of internal reflection is the angle which defines the limit of total reflection so that any incident light beam which has an angle of incidence greater than the critical angle will be totally reflected.

As can be seen when looking at FIGS. 2 and 3 the back surface of the screen 11 has a plurality of ridges thereon which form prism-like elements. The ridges 13 are parallel to each other and have curved sides 14 and 15. Each of the curved sides 14 and 15 meets at a peak thereof which appears in FIG. 3 as a line.

The angle of the sides 14 and 15 with respect to the plane in which the screen 11 lies at the point of interest is equal to or greater than 45°. As the sides 14 and 15 extend away from the screen 11 towards the intersection thereof, the angle with respect to the aforementioned plane decreases until the intersection is reached. At the intersection or peak, the angle of the side 14 and/or 15 with respect to the aforementioned plane is less than 45° but greater than or equal to the critical angle of internal reflection of the material forming the screen 11. The curvature of the sides 14 and 15 as above described is the key to the functioning of the instant screen. In the first place, without regard to any other considerations, the curvature of the sides 14 and 15 allow a certain amount of leeway in the angular relationship between the projector 10 and the mounting of the screen 11. As will be appreciated if a predetermined angle were necessary with a tolerance of 1° or less, the slightest movement of the projector 10 or the screen 11 would render the system less functionable and therefore would detract from it as a commercial item. By curving the sides of the screen 14 and 15 by, for example 6° to 10°, a considerably greater range of angular tolerance is built in without greatly adding to the directions from which ambient light can be reflected back to the audience.

Further advantages accrue from the curvature of the sides 14 and 15 which render the screen 11 of the instant invention a commercially usable item. By curving the sides, the direction in which light incident upon the screen 11 is transmitted back towards the audience is determined by the portion of the sides 14 or 15 upon which it strikes. Therefore if the sides 14 and 15 were straight, all of the light incident thereon would either be reflected directly back towards the projector or if at an improper angle of incidence would pass therethrough. Under the teaching of the prior patent, the light incident upon the screen 11 at a predetermined angle will be reflected back towards the audience at a plurality of range of angles which can be controlled by the degree of curvature of the sides 14 and 15 to provide a predetermined viewing area greater than merely directly in front of the screen. While this curvature does increase the directions from which light will be reflected back, the small angular range of viewing areas necessary for display purposes renders the compromise a practical commercial use.

A light ray emanating from the projector 10 and striking the screen 11 so as to hit the surface 14 or 15 close to a trough will be hitting a surface of approximately 45°. Such a light ray will be totally reflected and passed across to an opposite side thereof and is reflected back toward the projector parallel to the incident light ray. It should be noted at this point that a reversal or inversion takes place in small segments of the picture as the light rays pass through the prism-like ridges 13.

It will be appreciated that as the position of incidence of a light ray varies along a side 14 or 15 of a ridge 13, the angle at which the light ray will strike the back surface of the screen 11 will be altered since all incident light rays are parallel to each other. Therefore, as the position moves from the 45° at the troughs of the ridge 13 towards the lessening angles at the peaks thereof, the direction in which the light ray is reflected back towards the audience is varied. It will be appreciated that since there are two reflections and each time a reflection occurs, the angle of deviation from 45° is multiplied by two in terms of direction of reflection, a six degree curvature in the sides 14 and 15 of the ridges 13 will result in a dispersion of 24° on each side of the normal to the screen. It will of course be appreciated that additonal dispersion occurs due to refraction as the light ray passes back out the front face of the screen 11 so that the small curvature at the back thereof provides a substantial degree of dispersion of the projected light. In contradistinction to this, if in fact the sides were straight, not only would the dispersion caused by the curvature of the sides 14 and 15 not occur, but no refraction would occur since the light entering the front face of the screen 11 normal thereto would exit normal thereto and be undisturbed.

At this point it is important to understand that the curvature must begin at an angle of 45° or greater since no light would be reflected back towards the center audience if there were not a 45° angle. Therefore, the 45° angle provides the beginning point of total reflection. An angle of less than 45° will not reflect at all in the present configuration since one of the sides 14 or 15 would reflect the ray elsewhere. It is thought that it is better to allow a small amount of light to be lost rather than have a dead spot in the center of an audience. In the preferred embodiment, the critical angle of the material making up the screen 11 is less than 45° by an amount equal to the degree of curvature desired in the sides 14 and 15. Thus, if a 6° curvature were desired a material having a critical angle of 39° would be employed so that the sides 14 and 15 would vary in angle of curvature from slightly greater than 45° to cover the center portion of the audience to 39° at the peak. As a result of such an arrangement, all of the projected light incident upon the screen would be reflected back towards the desired portions of any audience array while the maximum angle of direction from which ambient incident light would be reflected is minimized.

Several materials exist which have critical angles of internal reflection with respect to air of approximately 39°. For example, polystyrene has a critical angle under such circumstances of 38.93° while poly (N-2, phenethyl) methacrylamide has a critical angle of 39.01 and poly (o-tolyl) methacrylate has a critical angle of 39.54. Listed below are additional materials which are suitable for use as the material making up the screen 11 with their critical angle with respect to air at 20° to 25° centigrade listed adjacent thereto:

| MATERIAL | CRITICAL ANGLE |
| --- | --- |
| polymethylacrylate | 42.53 |
| polyethylacrylate | 42.92 |
| polytutylacrylate | 43.01 |
| polyethoxyethylacrylate | 42.83 |
| poly (2 methoxyethyl) acrylate | 43.21 |
| poly (2 bromo sec. butyl) acrylate | 40.43 |
| poly (2 bromo phenyl) acrylate | 38.34 |
| poly (2 chloromethyl) acrylate | 41.23 |
| polyacrylonitrile | 41.47 |
| polymethylmethacrylate | 42.16 |
| polyethylmethacrylate | 42.33 |
| poly butyl methacrylate | 42.4 |
| poly (1 butyl) methacrylate | 43.09 |
| polycyclohexyl methacrylate | 41.59 |
| poly (2 hydroxyethyl) methyacrylate | 41.41 |
| poly (2 phenoxyethyl) methacrylate | 39.36 |
| poly phenylmethacrylate | 34.82 |
| poly (o chloro) styrene | 38.4 |
| poly (2,6 dichloro) styrene | 37.99 |
| poly (O methoxy) styrene | 38.87 |
| polyacetal | 41.47 |
| poly (n benzyl) methacrylamide | 38.78 |
| poly (N-butyl) methacrylamide | 41.36 |
| polyvinyl chloride | 40.53 |
| polyvinyl fluoride | 38.68 |
| polyvinylidene chloride | 38.68 |
| polyvinyl acetate | 42.97 |
| polyvinyl carbazole | 36.36 |
| polyvinyl isobutyl ether | 43.58 |
| polyvinyl alcohol | 41.81 |
| poly (n-vinyl) phthalimide | 38.13 |
| polyallyl phthalate | 41.21 |
| polyester-Styrene | 40.5 |
| polycarbonates (bisphenol) | 39.12 |
| zinc crown glass | 41.24 |
| higher dispersion crown glass | 41.14 |
| light flint glass | 39.41 |
| heavy flint glass | 37.31 |
| heaviest flint glass | 31.94 |

Looking at the front surface of the screen 12, it will be noted that a plurality of ridges 16 are formed thereon which are disposed perpendicularly to the ridges 13 formed on the back surface of the screen. It will be noted that the ridges 16 are formed from arcuate portions of cylinders. In this particular instance, each ridge 16 forms the surface of 30° of a cylinder. These ridges 16 act as optical elements for operating on the incoming light from the projector 10 for purposes of creating dispersion of the light to a predetermined range of areas in front of the screen 11 in the vertical field.

It should thus be appreciated that the ridges 16 operate in conjunction with the reflecting surfaces 14 and 15 to provide the dispersion in the vertical plane. Therefore, the position of the surfaces 14 and 15 with respect to the ridges 16 (the thickness of the screen 11) helps determine the degree of dispersion produced by the ridges 16. Therefore, if the back surface of the screen 11 made up of the surfaces 14 and 15 were considered flat and positioned at the focal point of each of the ridges 16, there would be no vertical dispersion of light. Rather, all of the light would be focused to come out parallel to the incident light. By varying the thickness it will be appreciated that a vertical field will be developed as the thickness of the screen is made less than the focal length of the ridges 16. The angle of dispersion and therefore the vertical field of the screen is increased until the thickness approaches 0. Certain improvements on the screen of U.S. Pat. No. 3,782,805 with respect to the optimum thickness of same are the subject of my copending application Serial No. filed concurrently with applicant's parent application, Ser. No. 534,297. It is, however, preferred that the peaks of the ridges 13 be located a distance from the front surface of the screen corresponding to from about 30 to about 70 percent of the focal length of the cylindrical surfaces 16 on the front surfaces of the screen.

Figure 4:
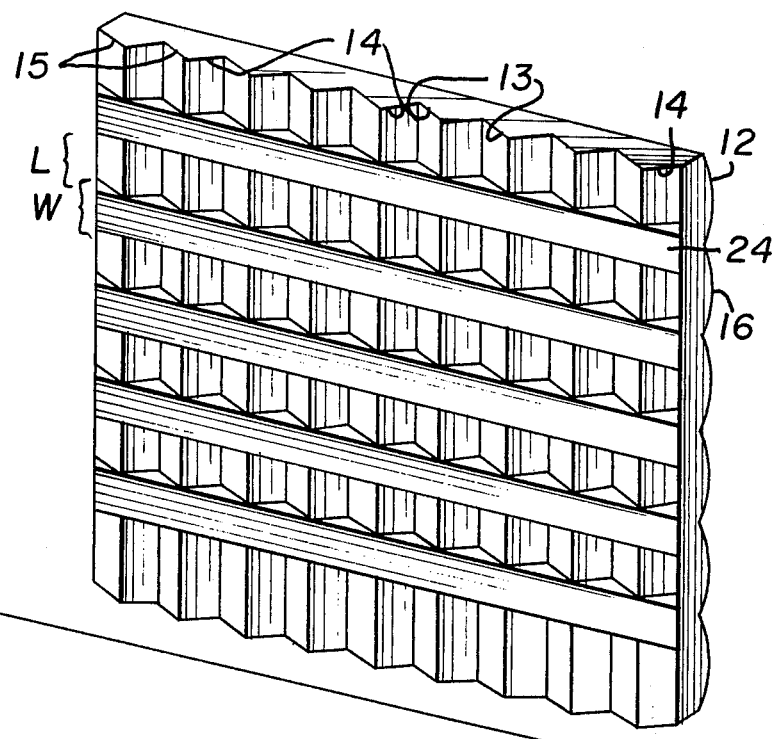
FIG. 4 is a back perspective view of the screen shown in FIG. 1.
Figure 7:
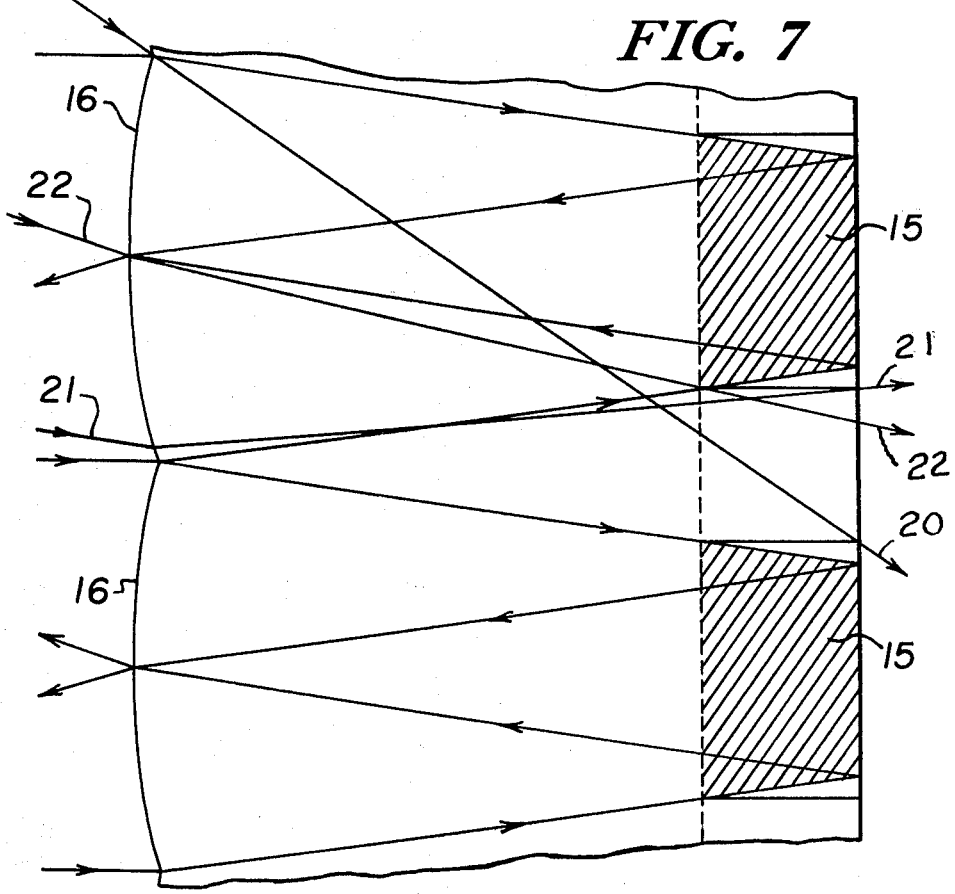
FIG. 7 is a side sectional diagrammatic view of a portion of the screen shown in FIG. 6.

Furthermore, as can best be seen in FIG. 7, only a portion of the surface of ridges 14 and 15 actually reflect back the projected light incident on the screen, that portion shown as shaded in FIG. 7. Other rays of ambient light as shown in lines 20, 21, and 22 pass through the screen in the areas of the ridges 14 and 15 of the screen shown in FIG. 3 which represent the planar portions 24 as shown in FIG. 4 or are absorbed in the coded surfaces 25 shown in FIG. 8, i.e., areas where light is not reflected back therefrom. Therefore, any ambient light, such as that light represented by lines 20, 21 and 22 either passes directly through the rear of the screen, passing through these planar portions 24, or is absorbed by the light-absorbing layer or coating 25, without being reflected back towards the front of the screen. As shown, these planar portions 24 and/or coated portions 25 are located in a horizontal plane corresponding to the intersection of adjacent cylindrical sections 16 on the front face of the screen.

In this manner, the presence of planar areas 24 or coated portions 25 extending across the back surface of the screen therefore intermittently divides the parallel rows of ridges into horizontal sections of parallel rows of ridges, as shown in FIGS. 4, 6, 8 and 9.

Figure 5:
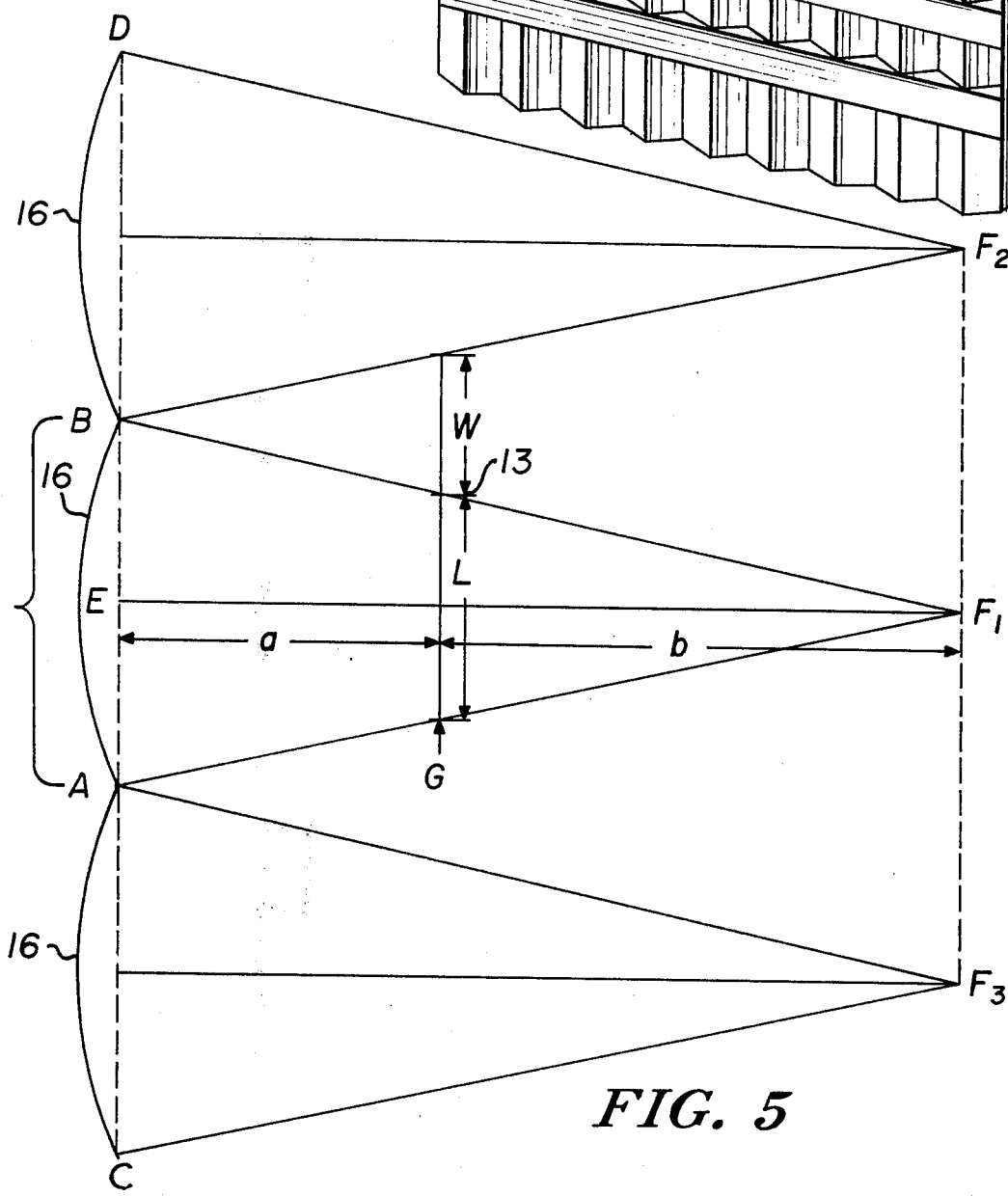
FIG. 5 is a diagrammatic representation of the relationship between the focal length of the cylindrical sections and the rear surface of the screen.
Figure 6:
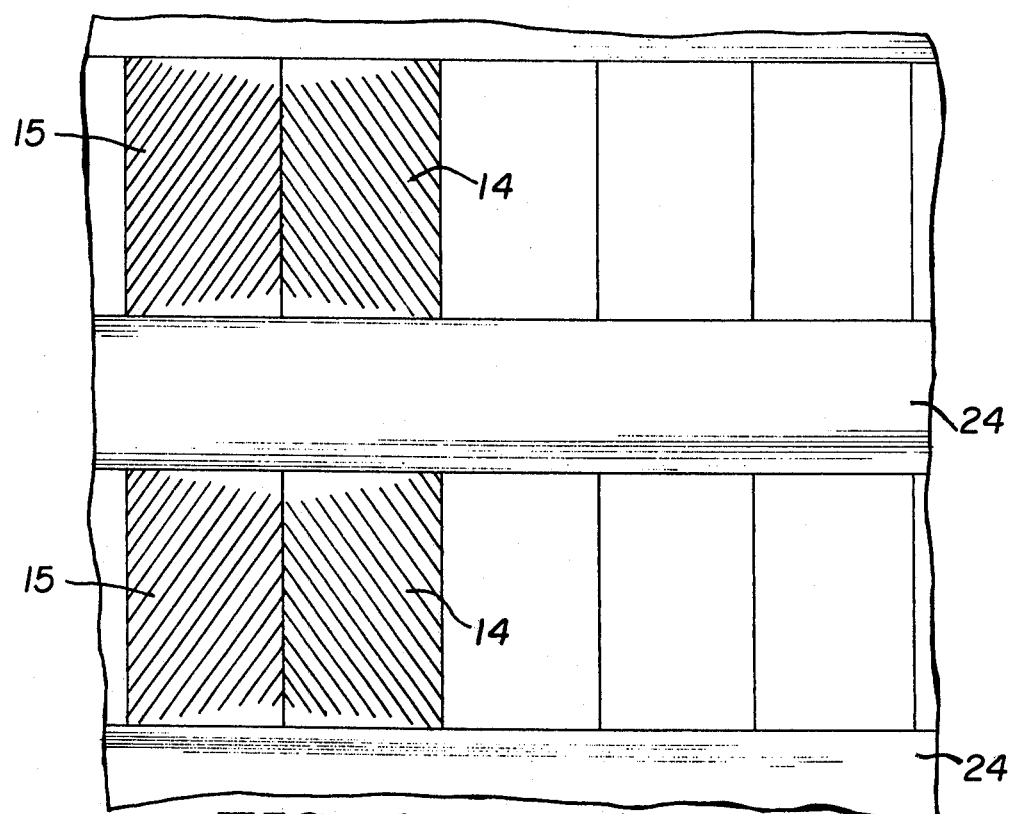
FIG. 6 is a partial sectional perspective view of a portion of the rear surface of the screen shown in FIG. 4.
Figure 8:
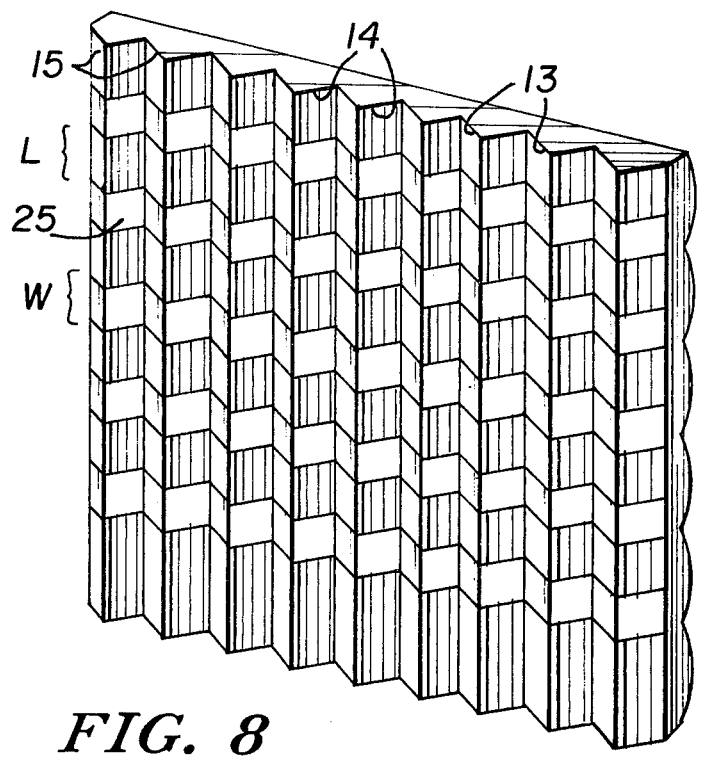
FIG. 8 is a back perspective view of another embodiment of the screen shown in FIG. 1.
Figure 9:
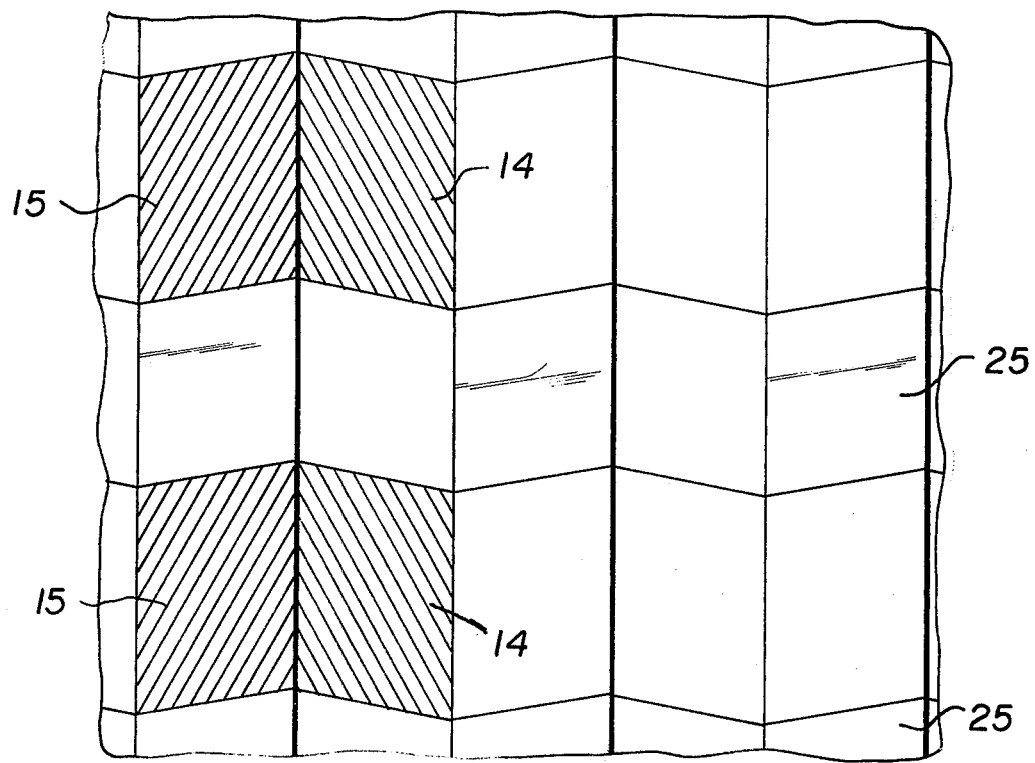
FIG. 9 is a partial sectional perspective view of a portion of the rear surface of the screen shown in FIG. 8.

When planar portions 24 are utilized, while they may be located at any distance from the front surface of the screen, between the troughs of the ridges 13 and the peaks of the ridges, it is most preferred that the planar portions 24 be located at the peaks of the ridges 13, i.e., at the thickest part of the screen. It has been found that such a location facilitates the mechanical construction of the screen. On the other hand, location of these planar surfaces 24 at the troughs of the ridges 13, or at the thinnest portion of the screen, does reduce the width of these planar portions to a minimum. On the other hand, when coatings 25 of light-absorbing material is employed, the coating is preferably merely applied to the rear surface of the screen, in horizontal strips, as shown in FIGS. 8 and 9. These coatings 25 will preferably comprise a light-absorbing material, such as a coating of black ink, black paint, etc. These types of coatings may be applied to any conventional techniques, including silk screening, etc. In an alternative procedure, however, the entire back of the screen may be coated with a light-sensitive coating, having a polarity opposite to that used in conventional photo negatives. In this manner, where light impinges on the photosensitive surface, the back of the screen will remain clear and where light does not impinge, it will become black. After the back of the screen has been so coated (and of course has not been exposed to light) the screen is positioned so that a light source is located where the projector would normally be. When the light source is thus activated, the coating on the rear of the screen will become exposed only at the shaded portion in FIG. 7. When the rear surface is then subjected to film developing materials, these portions of the screen will remain clear, and the remainder of the screen, i.e. the parallel strips, will turn black. It has also been found, however, that the length of each such row of parallel ridges, represented by L in FIGS. 4 and 8, is preferably greater than the shaded area shown in FIG. 7, that is, the shaded area shown in FIG. 7 represents the width of the beam of focused rays produced by the face of cylindrical section 16 associated therewith at that point. Referring to the FIG. 5, series of cylindrical surfaces 16 are represented, with their associated focal lengths terminating in focal points $F_1$, $F_2$ and $F_3$. Thus, each of the three cylindrical surfaces represented in FIG. 5 begins and terminates at points C-A, A-B and B-D, respectively. Thus, by representing the front face of the screen by chords $\overline{AC}$, $\overline{AB}$ and $\overline{BD}$, respectively, the focal length associated with cylindrical surface AB is represented by line $\overline{EF_1}$.

Where the rear surface of the screen, represented by ridge 13, is located at point G with respect to that focal length, a corresponding adjacent planar surface will be represented by width W. Similarly, the length of the parallel ridge 13 at point G is represented by length L, and the distances from the focal point $F$; to the rear surface of the screen, or point G, and from the front surface of the screen, or point E, to the rear surface of the screen are represented by dimensions $b$ and $a$, respectively. Normally, the ratio of the distance from the focal point to the rear surface of the screen over the distance from the rear surface of the screen to the front surface of the screen, or the thickness of the screen represented by $b$ and $a$, respectively, is equal to the ratio of the length of the parallel ridge L over the width of the planar section W. It has been found, however, that in the present invention it is highly preferred that the length of the parallel ridge 13 be longer than the distance L shown in FIG. 5. Therefore, in other words, it is most preferred that the ratio of the distance from the focal point to the rear surface of the screen (G) over the distance from the rear surface of the screen ($g$) to the front surface of the screen ($e$) be less than the ratio of the length of the parallel ridge ($l$) over the width of the planar surface (W). Furthermore, these ratios may also be employed to determine the width ($w$) of the coated sections 25, as shown in FIGS. 8 and 9. In this manner, the "tiltability" of the screen is improved without yielding a significant degree of the ability of the screen to permit ambient light directed from sources other than the projector to either pass through the back of the screen or be absorbed thereon, without reflecting same, while at the same time not adversely affecting the ability of the screen to select light from a predetermined critical angle in the horizontal direction for reflection back to the audience.

In addition, as was the case in the screen of U.S. Pat. No. 3,782,805, it can also be appreciated that the size of the ridges 13 and 16 must be close together so as not to create resolution difficulties. As mentioned above, the ridges 13 cause a reversal of a small portion of the picture so that distinct resolution problems would occur if they were sufficiently large. Therefore, the number of ridges 13 and 16 are made large compared with the resolution desired. Therefore, in order to display a picture such as a television picture having a resolution over 500 lines, it is desirable that over 500 ridges 13 and 16 be provided on a screen for projection thereof.

It should be understood that while this invention has been described with respect to a specific embodiment thereof, numerous others may become obvious to those of ordinary skill in the art in light of this disclosure.

What is claimed is:

1. A front projection screen made from a sheet of light-transmitting material having a predetermined critical angle of internal reflection less than 45°; said sheet having a front surface and a back surface; said screen being characterized by:
   a plurality of parallel ridges formed on said front surface, each forming a section of a cylinder having a predetermined focal length;
   a plurality of parallel ridges formed on said back surface, each having curved sides terminating at a peak; said curved sides extending away from said sheet at an angle equal to or greater than 45° immediately adjacent to said sheet; the angle between a line tangent to said sides and said sheet continuously decreasing as said curved sides extend toward said peak; the angle between a line tangent to said sides and said sheet being greater than or equal to said predetermined critical angle of internal reflection at said peaks but less than 45°;
   said ridges on said front surface being disposed perpendicularly to said ridges on said back surface; and
   means on said back surface formed parallel to said ridges on said front surface for intermittently interrupting said parallel ridges on said back surface so that light incident upon said means is not reflected therefrom.

2. The front projection screen of claim 1 wherein said means formed on said back surface comprises light-absorbing means.

3. The front projection screen of claim 2 wherein said light-absorbing means comprises parallel coatings of a light-absorbing liquid.

4. The front projection screen of claim 1 wherein said means formed on said back surface comprises light-transmitting means.

5. The front projection screen of claim 1 wherein the ratio of the length of said intermittently interrupted parallel ridges formed on said back surface over the width of said means on said back surface is greater than the ratio of the distance from the focal point of each of said cylindrical sections formed on said front surface to the back surface of the screen over the thickness of said screen.

6. A front projection screen made from a sheet of light-transmitting material having a predetermined critical angle of internal reflection less than 45°; said sheet having a front surface and a back surface; said screen being characterized by:
a plurality of parallel ridges formed on said front surface, each forming a section of a cylinder having a predetermined focal length;
a plurality of parallel ridges formed on said back surface, each having curved sides terminating at a peak; said curved sides extending away from said sheet at an angle equal to or greater than 45° immediately adjacent to said sheet; the angle between a line tangent to said sides and said sheet continuously decreasing as said curved sides extend toward said peak; the angle between a line tangent to said sides and said sheet being greater than or equal to said predetermined critical angle of internal reflection at said peaks but less than 45°;
said ridges of said front surface being disposed perpendicularly to said ridges on said back surface; and
said parallel ridges formed on said back surface being intermittently interrupted by a plurality of repeating planar surfaces formed parallel to said ridges on said front surface.

7. The front projection screen of claim 6 wherein said plurality of repeating planar surfaces are located in a horizontal plane corresponding with the line of intersection of said cylindrical sections formed on said front surface.

8. The front projection screen of claim 7 including a repeating planar surface corresponding to the intersection of each cylindrical section on said front surface.

9. The front projection screen of claim 6 wherein said repeating planar surfaces are parallel to the plane of said screen.

10. The front projection screen of claim 6 wherein the ratio of the length of said intermittently interrupted parallel ridges formed on said back surface over the width of said repeating planar surfaces is greater than the ratio of the distance from the focal point of each of said cylindrical sections formed on said front surface to the back surface of the screen over the thickness of said screen.

11. The front projection screen of claim 6 wherein said repeating planar surfaces are located at said peaks on said back surface of said screen.

12. A front projection screen made from a sheet of light-transmitting material having a predetermined critical angle of internal reflection less than 45°; said sheet having a front surface and a back surface; said screen being characterized by:
a plurality of parallel ridges formed on said front surface, each forming a section of a cylinder having a predetermined focal length;
a first plurality of parallel ridges formed on said back surface, each having curved sides terminating at a peak;
a planar surface formed on said back surface adjacent to said first plurality of parallel ridges, and parallel to said ridges on said front surface;
a second plurality of parallel ridges formed on said back surface, each having curved sides terminating at a peak;
the curved sides of each of said first and second plurality of parallel ridges extending away from said sheet at an angle equal to or greater than 45° immediately adjacent to said sheet; the angle between the line tangent to said sides and said sheet continuously decreasing as said curved sides extend toward said peak; the angle between a line tangent to said sides and said sheet being greater than or equal to said predetermined critical angle of internal reflection at said peaks but less than 45°;
said ridges on said front surface being disposed perpendicularly to said first and second plurality of parallel ridges on said back surface.

13. The front projection screen on claim 12 wherein said planar surface is located at said peaks on said back surface of said screen.

14. The front projection screen of claim 12 wherein said peaks of said first and second plurality of parallel ridges are located a distance from said front surface corresponding to from 30 to 70 percent of said focal length.

15. The front projection screen of claim 12 wherein the ratio of the length of each of said first and second plurality of parallel ridges formed on said back surface over the width of said planar surface is greater than the ratio of the distance from said focal points of said cylindrical sections formed on said front surface to the back surface of the screen over the thickness of said screen.

16. The front projection screen of claim 12 including a plurality of first and second pluralities of parallel ridges alternating with a plurality of said planar surfaces.

17. The front projection screen of claim 12 wherein said planar surfaces are located in a plane parallel to the plane of said screen.

* * * * *